United States Patent [19]

McDaniel et al.

[11] 4,364,855

[45] Dec. 21, 1982

[54] PRODUCTION OF ALUMINUM PHOSPHATE FROM CONCENTRATED MASS

[75] Inventors: Max P. McDaniel; Marvin M. Johnson, both of Bartlesville, Okla.

[73] Assignee: Phillips Petroleum Company, Bartlesville, Okla.

[21] Appl. No.: 221,753

[22] Filed: Dec. 31, 1980

[51] Int. Cl.$^3$ .................. B01J 27/18; C01B 15/16; C01B 25/16

[52] U.S. Cl. .................. 252/437; 423/308; 423/309; 423/311

[58] Field of Search .......... 423/308, 309, 311; 252/437

[56] References Cited

U.S. PATENT DOCUMENTS

| | | | |
|---|---|---|---|
| 2,538,867 | 1/1951 | Gregor | 423/309 |
| 2,840,551 | 6/1958 | Field et al. | 260/93.7 |
| 3,147,227 | 9/1964 | Hansford | 423/311 |
| 3,157,712 | 11/1964 | Walker | 260/683.15 |
| 3,271,299 | 9/1966 | Kearby | 423/311 |
| 3,385,659 | 5/1968 | Turner et al. | 423/311 |
| 3,617,569 | 11/1971 | Daniels et al. | 423/311 |
| 3,904,550 | 9/1975 | Pine | 252/437 |
| 4,147,758 | 4/1979 | Adrian et al. | 423/315 |
| 4,219,444 | 8/1980 | Hill et al. | 252/435 |

FOREIGN PATENT DOCUMENTS

| | | | |
|---|---|---|---|
| 704951 | 3/1965 | Canada | 423/311 |
| 1269892 | 9/1960 | France . | |
| 1326148 | 3/1963 | France | 423/311 |
| 2323702 | 9/1976 | France . | |
| 917762 | 2/1963 | United Kingdom . | |

*Primary Examiner*—O. R. Vertiz
*Assistant Examiner*—Wayne A. Langel

[57] ABSTRACT

Aluminum orthophosphate is prepared by combining a source of orthophosphate ions with an aluminum salt to form a concentrated mass, gelling, and thereafter converting the resulting hydrogel to a xerogel by removing water. The resulting aluminum phosphate is particularly suited for use as a base for a chromium olefin polymerization catalyst.

20 Claims, No Drawings

PRODUCTION OF ALUMINUM PHOSPHATE FROM CONCENTRATED MASS

BACKGROUND OF THE INVENTION

This invention relates to the production of aluminum phosphate. In the production of aluminum phosphate by combining aqueous solutions of an aluminum salt and a source of phosphate ions, such as phosphoric acid, followed by neutralization with a base to give a precipitate or a true hydrogel is well known in the art. The resulting phosphate has been disclosed to have several utilities including use as a support for chromium oxide catalysts. There is considerable progression in the art with regard to the preparation of aluminum phosphate catalysts with the newer art suggesting forming the gel at a relatively high pH in order to obtain a higher surface area product. Generally, the art suggests converting the hydrogel to a xerogel by means of simple oven or tray drying or spray drying although it is incidentally taught in the art to wash with a water miscible liquid, such as an alcohol.

At least as it relates to a base for chromium catalysts, even the most advanced teachings of the prior art still do not produce a base which has found favor as a chromium catalyst support for olefin polymerization. Thus, chromium catalysts are generally supported on silica-containing bases similar to those used decades ago when the chromium catalyzed polymerization of olefin polymers first became commercial.

SUMMARY OF THE INVENTION

It is an object of this invention to provide a novel method of producing aluminum phosphate;

It is a further object of this invention to produce a superior aluminum phosphate for use as a base for chromium catalyzed olefin polymerization; and It is still yet a further object of this invention to provide a simplified method of producing aluminum phosphate.

In accordance with this invention, a source of orthophosphate ions is combined with an aluminum salt to form a concentrated mass, thereafter this mass is combined with a base to form a hydrogel and water is removed to convert the hydrogel to a xerogel.

DESCRIPTION OF THE PREFERRED EMBODIMENTS

The essence of this invention is the formation of an aluminum phosphate gel from a concentrated mass of reactants comprising aluminum ions from an aluminum salt and a source of orthophosphate ions. This is done by using an aluminum salt which will melt, preferably one which will melt at or below the boiling point of water or by forming a syrup of a water soluble aluminum salt and a very small amount of water.

Generally, hydrated aluminum salts such as hydrated aluminum nitrate are most susceptible to being melted and thus are preferred as the source of aluminum ions for the melt method. Aluminum bromide and hydrated aluminum bromate can also be used as can, broadly, any aluminum salt which will melt. If desired up to 20 weight percent additional water can be present based on the weight of the aluminum salt or there can be no water except the water, if any, from the water of hydration and the water, if any, from the base used in the subsequent neutralization, i.e., no extraneous water is added. By additional water is meant water actually added as water and does not count the water, if any, from the water of hydration of the ingredients and/or the water from the base, if any. There may be some advantage to adding 1 to 15 weight percent water based on the weight of the aluminum salt, however. The percentages of water are based on the actual weight of the aluminum salt including any water of hydration.

Alternatively, an aluminum salt which will not necessarily melt but which will dissolve enough to form a syrup in 40 weight percent, or less, water based on the weight of the aluminum salt can be used. Generally, 5 to 20 weight percent water is used based on the weight of the aluminum salt when a syrup is formed. Aluminum sulfate, for instance is ideally suited for use in this embodiment of the invention.

The source of the phosphate ions can be any source of orthophosphate ions and is generally orthophosphoric acid or orthophosphates, such as monobasic ammonium phosphate or dibasic ammonium phosphate or mixtures thereof.

The temperature, if a melt is used, can be any temperature at or above which the aluminum salt chosen will melt. The reaction can be carried out in any atmosphere including air or can be carried out under an inert atmosphere for instance. Generally, temperatures of 65°–200° C., preferably 65°–100° C. are used. Although, since the preferred aluminum salt is $Al(NO_3)_3 \cdot 9H_2O$ which melts at 73° C., the most preferred temperatures based on the use of this aluminum salt is about 80° C.±5° C. If a very concentrated syrup of a water soluble aluminum salt and water are used, any temperature up to the boiling point of the water under the conditions employed can be used, preferably 20°–100° C.

One of the advantages of this invention is that, since very little water, if any, is present during the formation of the aluminum phosphate, it is not necessary to utilize azeotropic distillation or washing with a normally liquid water miscible organic solvent to remove the water gently. The most important advantage, however, is that the concentrated mass gives a gel with greater physical strength.

Low pore volume hydrogels usually give the highest porosity xerogels after drying because they have superior internal strength to withstand the compression of surface tension during drying. Thus, if the hydrogel occupies 6 cc per gram of aluminum phosphate or less, generally 3 to 6 cc per gram, it will give a xerogel having improved porosity for a catalyst base than will a hydrogel conventionally prepared from a dilute aqueous solution which will occupy about 11 cc per gram or more. By 6 cc per gram, for instance is meant that each gram of any aluminum phosphate occupied 6 cc in the hydrogel stage. Thus, another way to define the novel process of this invention is that the aluminum salt melt/phosphate mass or aluminum syrup/phosphate mass is sufficiently concentrated so as to give a hydrogel which occupies 3 to 6 cc per gram. The theoretical minimum if no extraneous water is added is about 3 cc per gram with aluminum nitrate.

The following four representative calculations of the volume per gram within the scope of the invention and the fifth calculation showing the same mathematics for a run of the prior art is presented to facilitate an understanding of the meaning of the concept of the final dry aluminum phosphate having occupied a relatively small number of cc per gram in the prior hydrogel stage. These calculations are based on the use of one quarter mole of Al(NO$_3$)$_3$.9H$_2$O and about one-fifth mole monobasic ammonium phosphate plus sufficient Cr(NO$_3$).9H$_2$O to give one weight percent chromium in the final catalyst. The slight disparity between the mole ratio of aluminum nitrate to aluminum phosphate reflects the desire to have an 0.8 phosphorus to aluminum ratio in the final phosphate. It has been found experimentally that this amount of material when the aluminum nitrate is melted and the other ingredients added thereto occupies about 90 cc. If it is gelled with ammonia gas, the ammonia gas will add no appreciable amount to the volume and the volume of the gel is approximately equal to the volume of the melt. This, then, gives one quarter mole of low phosphorus aluminum phosphate which weighs approximately 27 grams when washed of salts and dried. As previously set out, this amount of material in the hydrogel stage occupied 90 cc. Ninety divided by 27 is 3.3 cc per gram representing approximately the theoretical minimum space which one gram of dry aluminum phosphate can occupy when in the hydrogel state. This might vary slightly if other starting ingredients were used.

More typically, however, neutralization will be carried out in accordance with the invention by neutralizing with 46 cc of ammonium hydroxide per one quarter mole. This then will add 46 cc to the 90 cc volume obtained with no water added in the neutralization to give a total of 136 cc which will still produce the same 27 grams of aluminum phosphate when washed of salts and dried. One hundred thirty-six divided by 27 equals 5.0 which is the volume in cc occupied in the hydrogel state by one gram of final dry aluminum phosphate in this preparation.

In many runs, a very small amount of water, for instance 10 cc were added to the melt giving a total volume of 100 cc instead of 90. Then on adding 46 cc of ammonium hydroxide, the total volume would be 146 which would still produce 27 grams of dry aluminum phosphate. One hundred forty-six divided by 27 equals 5.4 cc of hydrogel which give one gram of final dry aluminum phosphate.

Even if 40 percent water based on the aluminum salt is used, this is still very small amount of water overall. For instance, 40 percent of 93 grams, the weight of one quarter mole Al(NO$_3$).9H$_2$O is only 37 cc which added to 136 cc gives a total volume of hydrogel of 173 cc, which divided by 27 grams is 6.4 cc per gram.

In the prior art, typically 0.2 to 2 liters of water are utilized with one quarter mole of ingredients. Taking the lower end of this typical preparation of 0.2 liter, this added to the 136 cc obtained when no water is added would give 336 cc total volume divided by the 30 grams of product would give about 11 cc per gram. A more typical prior art preparation utilizing about one liter of water with one quarter mole of ingredients would give 1136 cc which divided by 27 would be 42 cc per gram.

If it is desired to wash the hydrogel with water, then azeotropic distillation or washing with a volatile, oxygen-containing water miscible organic solvent having a relatively low surface tension is desirable (adding water after the gel is formed does not harm the pore structure if it is removed gently as just described). After drying of water in this manner, the gel is preferably dried of solvent under mild conditions, for instance by heating at a temperature of 25° to about 150° C., most preferably under vacuum.

It may be desirable in some instances to coprecipitate other materials with the phosphate such as titania or have other materials present during the gellation and/or activation such as fluoride. For instance, if the purpose is to produce a support for a chromium catalyst, the chromium compound such as chromium nitrate can be introduced with the reactants. Similarly, a silicon compound, such as silicon tetraethoxide can be coprecipitated with the phosphate.

When the object is to produce a catalyst base, it is frequently preferred that a small amount of a boron compound, such as boric acid, be introduced into the concentrated mass to be coprecipitated with the aluminum phosphate. Other suitable boron compounds include borates, such as ammonium borate. By coprecipitated as it relates to the boron compound, it is meant that the aluminum phosphate is formed into a true hydrogel in the presence of the boron compound. It is not known to what extent the borate becomes incorporated in the hydrogel structure. The amount of boron compound present when the aluminum phosphate is gelled can vary widely but it is generally used in an amount so as to give 1 to 30 mole percent boron compound based on the moles of phosphate.

The gellation is generally brought about by neutralization carried out either by adding the acid phase, i.e., the aluminum salt/phosphate combination, to a base phase or vice versa. One suitable practice is to drip or spray or otherwise slowly introduce the acid phase into the base phase. This results in the production of small spheres or balls of the orthophosphate when the melt of the aluminum salt and the source of phosphate ions is dripped or sprayed or otherwise slowly added to a large excess of ammonium hydroxide. The spheres are subsequently collected, washed, dried, and if desired calcined.

Gellation occurs spontaneously at a pH of about 4, which is achieved by combining about 72 percent of the neutralizing agent, and it has been found that this is undesirable. Therefore, neutralization is preferably achieved by either: (1) combining slowly with stirring about 72 percent of the amount of neutralizing agent needed for complete neutralization and thereafter quickly adding the rest so as to quickly go through the 4 to 5 pH range and achieve gellation at a pH of 5 or greater, preferably at least 6, generally 6 to 10, or (2) combining 60 to 70 percent of the neutralizing agent needed for complete neutralization and aging until gellation occurs which will generally be 1 minute to 48 hours, more generally 5 minutes to 10 hours, more generally 10 minutes to 3 hours; thus, gellation occurs at a pH below 4, generally about 2.

Also ethylene oxide or propylene oxide or ammonium carbonate or any agent which will neutralize the acid can be used alone or in combination to effect gellation.

The resulting aluminum phosphate can be utilized as a filler in rubber or plastics, as a catalyst, or as a base for vanadium or chromium so as to produce a catalyst for olefin polymerization. In the case of chromium, the chromium-containing xerogel must be activated in an oxidizing ambient. This can be carried out either by having chromium coprecipitated with the hydrogel or adding chromium to the hydrogel or adding an anhydrous solution of a chromium compound to the xerogel and thereafter heating in an oxidizing ambient such as air. The chromium or vanadium is present in an amount within the range of 0.001 to 10, preferably 0.1 to 5, more preferably about 1 weight percent based on the weight of the dried support. The activation of the thus formed xerogel can be carried out at a lower temperature than is generally required for activating silica based chromium catalysts. Temperatures of 150°–800° C., preferably 300°–800° C., more preferably 300°–600° C. and times of 1 minute to 48 hours, preferably 0.5 to 10 hours are suitable. Alternatively, the activation can be carried out in any ambient under dry conditions and thereafter a zerovalent chromium, for instance $\pi$-bonded organochromium compounds such as dicumene chromium or dibenzene chromium, added anhydrously. Any ambient can also be used when the support is used to carry vanadium.

If the purpose is to produce a chromium catalyst support, the aluminum and phosphorus components are selected so as to give an atom ratio of phosphorus to aluminum within the range of 0.2:1 to 1:1, preferably 0.6:1 to 0.9:1. Broadly, however, any ratio, for instance from 0.1:1 to 2:1 can be used.

The catalysts produced using the base prepared by the novel method of this invention containing a chromium or vanadium compound thereon can be used to polymerize at least one mono-1-olefin containing 2 to 8 carbon atoms per molecule. Such catalysts are of particular applicability in producing ethylene homopolymers and copolymers of ethylene and one or more comonomers selected from 1-olefins containing 3 to 8 carbon atoms per molecule such as propylene, 1-butene, 1-pentene, 1-hexene and 1-octene. These polymers can be produced by solution polymerization, slurry polymerization, and gas phase polymerization using conventional equipment and contacting processes. Contacting of the monomer or monomers with the catalyst can be effected by any manner known in the art of solid catalyst. One convenient method is to suspend the catalyst in an organic medium and to agitate the mixture to maintain the catalyst in suspension throughout the polymerization process. Typically, predominantly ethylene copolymers are prepared using 0.5–20 weight percent comonomer as described above in the feed, preferably sufficient comonomer to give 97 to 99.6 weight percent polymerized ethylene units in the resulting copolymer.

When the novel method of making a phosphate of this invention is used to make a phosphate for a catalyst base for a chromium or vanadium olefin polymerization catalyst, the resulting catalyst can be used in conjunction with a cocatalyst if desired. Suitable cocatalysts include organometal compounds primarily aluminum and boron alkyls. The most preferred boron compounds are trihydrocarbylboron compounds, particularly trialkylboron compounds, such as tri-n-butylborane, tripropylborane, and triethylborane (TEB). Suitable aluminum alkyls include $R_3Al$, $R_2AlX$, and $RAlX_2$ where R is a 1 to 12 carbon atom hydrocarbyl radical and X is a halogen preferably chlorine. Triethylaluminum and diethylaluminum chloride are particularly suitable.

EXAMPLE I

A number of samples of aluminum phosphate were made in accordance with this invention and used as a base for a chromium catalyst by the following general techniques. The desired quantity of an aluminum salt such as $Al(NO_3)_3.9H_2O$, e.g., about 1 lb. (454 g), was heated to about 80° C. to form a melt. The desired quantity of an ammonium phosphate, e.g., $NH_4H_2PO_4$, was dissolved in the melt to provide the atomic ratio of P/Al needed, and finally the desired amount of chromium(III) acetate or chromium(III) nitrate was added to the melt mixture to provide about 1 weight percent chromium based on the weight of the dry, finished catalyst. Sufficient concentrated $NH_4OH$, e.g., 30 weight percent $NH_3$, was mixed with the melt mixture to neutralize it giving a pH of about 6 to 7. The resulting mixture was washed with sufficient deionized water to remove substantially all of the ammonium nitrate by-product and the washed product in turn was washed with isopropyl alcohol or other volatile water-miscible organic liquid to displace the water or azeotrope dried. The resulting product was further dried in a vacuum oven and activated in a fluidized bed in dry air for about 5 hours at the specified temperature.

Alternatively, the melt containing the $Al(NO_3)_3.9H_2O$, the $NH_4H_2PO_4$ and the $Cr(NO_3)_3.9H_2O$ can be treated with $NH_4OH$ to obtain a pH of about 6 to 7 to form the gel and the gel dried in the presence of the by-product $NH_4NO_3$. While this is essentially a nonaqueous system, there is a small amount of water present such that a sheet of pH indicator paper can be pressed into the gel and a pH reading obtained. The dry product can then be cautiously calcined to obtain the final catalyst. This procedure must be done carefully to avoid potential explosions or other undesired reactions.

EXAMPLE II—ETHYLENE POLYMERIZATION

Each run was conducted in a clean, dry, air-free, stirred, stainless steel reactor of about a 2 L capacity. About 600 g of isobutane was used in each run as diluent with a catalyst charge ranging from about 0.03 to about 0.8 g. The reactor and its contents were heated to the desired operating temperature, ethylene was pressured in to give about 565 psia (3.9 MPa), and the run was started immediately as the catalysts, unlike the corresponding chromium oxide-silica catalysts, do not have an induction period. Ethylene pressure was maintained during the run by supplying additional ethylene as required from a reservoir.

Each run was terminated by stopping the ethylene flow and venting the gaseous reactor contents to a flare line for disposal. The polymer was recovered, dried and weighed to determine catalyst productivity which is expressed in terms of grams polyethylene per gram catalyst. When used as a reactor additive (add.) triethylborane (TEB) was added to the reactor as 1 weight percent solution in n-heptane. Hydrogen, when used, was admitted to the reactor to provide 50 psi (0.34 MPa) partial pressure of the total 565 psia reactor pressure.

The physical properties of each polymer, in this and subsequent examples, when given, were determined in accordance with the following ASTM test procedures.

| | |
|---|---|
| Melt index (MI) | ASTM D 1238-65T, Condition E. |
| High load melt index (HLMI) | ASTM D 1238-65T, Condition F. |
| Density, g/cc | ASTM D 1505-68. |

The HLMI/MI ratio is thought to give an indication of the polymer molecular weight distribution or shear response. As the ratio increases, the molecular weight distribution is also thought to increase.

The heterogeneity index (HI) is thought to provide a more accurate representation of polymer molecular weight distribution. HI is determined from the weight average and number average molecular weight values obtained from size exclusion chromatography and is defined as the ratio of weight average to number average molecular weights. As the ratio increases, the molecular weight distribution is thought to broaden.

Ethylene polymerization was carried out with samples of the catalysts activated at different temperatures and the results are summarized in Table I.

Catalyst 4 base was prepared in the manner used for catalyst 2 base except that in the gelling step the 100 mL of melt was diluted to 400 mL with water (300 mL of water) and to it was added 46 mL of concentrated NH$_4$OH.

Catalyst 5 base was prepared in the manner used for catalyst 2 base except that gelling occurred before all

TABLE I

| Run No. | Prep. | P/Al | Act. Temp. °C. | Add. | Run Temp. °F. | Prod. g/g | Time min. | MI | HLMI/MI |
|---|---|---|---|---|---|---|---|---|---|
| 1 Control | Aq-Az[1] | 1.0 | 500 | None | 205 | 1725 | 90 | 0 (.74 H)[6] | — |
| 2 Control | Aq-Az[1] | | | 8 ppm TEB | (96° C.) | 3565 | 65 | .43 | 375 |
| 3 Control | Aq-Az[1] | | | H$_2$ | | 1400 | 90 | .30 | 152 |
| 4 Control | Aq-Az[1] | | | 8 ppm TEB + H$_2$ | | 2515 | 50 | 11.4 | 57 |
| 5 Control | Aq-OD[2] | 0.9 | 700 | None | 225 | 605 | 90 | 0 (.86 H) | — |
| 6 Control | Aq-OD[2] | | | 8 ppm TEB | (107° C.) | 509 | 60 | 1.2 | 144 |
| 7 Control | Aq-OD[2] | | | H$_2$ | | 427 | 100 | 0.95 | 104 |
| 8 Control | Aq-OD[2] | | | 8 ppm TEB + H$_2$ | | 605 | 90 | 32 | 47 |
| 9 Invention | Melt-Az[3] | .8 | 700 | None | 205 | 3844 | 60 | 0 (.76 H) | — |
| 10 Invention | Melt-Az[3] | | | 4 ppm TEB | (96° C.) | 9420 | 60 | 1.41 | 122 |
| 11 Invention | Melt-Az[3] | | | 4 ppm TEB + H$_2$ | | 5340 | 60 | 6.8 | 64 |
| 12 Invention | Melt-Az[3] | .8 | 500 | None | 205 | 3135 | 60 | 0 (.37 H) | — |
| 13 Invention | Melt-Az[3] | | | 4 ppm TEB | (96° C.) | 5440 | 60 | .51 | 143 |
| 14 Invention | Melt-Az[3] | | | 4 ppm TEB + H$_2$ | | 5605 | 60 | 3.15 | 73 |
| 15 Invention | Melt-OD[4] | .8 | 600 | 4 ppm TEB | 205 (96° C.) | 3010 | 90 | .03 | 533 |
| 16 Invention | Melt-Az[5] | .8 | 600 | 4 ppm TEB | 205 (96° C.) | 2230 | 60 | .04 | 511 |

[1]Aqueous precipitation and azeotrope drying, i.e., a conventional dilute mass.
[2]Aqueous precipitation and oven drying, also a conventional dilute mass.
[3]Hydrogel formed from melt but then water added to wash followed by azeotropic drying. This demonstrates the effect of a concentrated mass at the critical time, i.e., when the reactants are combined and shows subsequent addition of water not being harmful.
[4]Hydrogel formed from melt but then water added to wash followed by oven drying, i.e., also a concentrated mass during gellation. In this run, 469 g (1.25 mole) of Al(NO$_3$)$_3$.9H$_2$O and 3.98 boric acid were used with sufficient monobasic ammonium phosphate to give the P/Al ratio of 0.8. Some water (125 mL) was in the melt and the melt was dripped into concentrated ammonium hydroxide.
[5]Like [4] except washed in alcohol and the alcohol removed in a vacuum oven. While the productivity is not outstanding in this run, other runs gave better overall results. One other run similar to this except without boric acid and using aluminum sulfate instead of aluminum nitrate gave 3,200 grams polymer per gram of catalyst in 25 minutes.
[6]"H" indicates HLMI.

Runs 9–16 show a general advantage to the use of the melt technique in productivity and/or melt index.

EXAMPLE III

A series of aluminum phosphate gels was prepared by employing the melt technique and several variations thereof as shown below in which a melt was formed from 94 g (0.25 mole) of Al(NO$_3$)$_3$.9H$_2$O, 23 g (0.2 mole) of NH$_4$H$_2$PO$_4$, and 2.4 g (0.006 mole) of CR(NO$_3$)$_3$.9H$_2$O by application of gentle heat to give a volume of about 100 mL at a temperature of about 80° C. The calculated P/Al atomic ratio is about 0.8:1. To the melt was added with vigorous stirring, 46 mL (0.72 mole NH$_3$) of concentrated NH$_4$OH (30 weight percent NH$_3$). The reaction mass at a pH of about 6 to 7 set to a hard gel, which was thoroughly washed with hot, deionized water and the washed product divided in two approximately equal portions.

Portion 1 (catalyst 1 base or support) was dried overnight (about 15 hours) in a vacuum oven at 80° C.

Portion 2 (catalyst 2 base) was dried of water by azeotrope distillation with isoamyl alcohol. The alcohol was removed by heating at 60° C. in a vacuum oven.

Catalyst 3 base was prepared in the manner used for catalyst 2 base except that in the gelling step the 100 mL of melt was diluted to 200 mL with water (100 mL water) and to it was added 46 mL of concentrated NH$_4$OH.

the ammonium hydroxide solution was added because of slow addition right up to the end. The pH was about 3 to 4 at this stage and the gel was washed and dried as for catalyst 2 base. This shows that the pH during gelling should be about 5 or above if gellation is to be forced by combination with base until gellation occurs. Partial neutralization followed by aging will give a good product, however.

Catalyst 6 base was prepared by gelling 100 mL of the melt with 46 mL of concentrated ammonium hydroxide as described at the beginning of this Example. The resulting gel was dried overnight in a vacuum oven at 80° C. without removal of the salt by-product.

Catalyst 7 base was prepared in the manner used for catalyst 2 base except that in the gelling step the 100 mL of melt was gelled with a solution of 46 mL of NH$_4$OH diluted to 100 mL.

A portion of each catalyst base was then activated at 500° C. for 5 hours as before. The surface areas of the recovered, activated catalysts were then determined by the B.E.T. nitrogen sorption method as known in the art.

A portion of each catalyst was tested in ethylene polymerization at 96° C. using 4 ppm TEB as adjuvant in each run.

The surface area of each catalyst and its productivity in terms of grams polymer per g catalyst per hour are given in Table II.

TABLE II

Effect Of Gel Mass Concentration

| | Catalyst Base | Catalyst Base | Catalyst Surface Area, m²/g | Productivity g/g cat/hr | Remarks |
|---|---|---|---|---|---|
| 1 | Invention | Concentrated | 330–380[a] | 2540 | washed, oven dried |
| 2 | Invention | Concentrated | 330–380[a] | 3955 | washed, azeotrope dried |
| 3 | Control | Dilute | 254 | 3540 | diluted before gelling |
| 4 | Control | Dilute | 223 | 3020 | diluted before gelling |
| 5 | Invention | Concentrated | 493 | dead | gel at acid pH |
| 6 | Invention | Concentrated | 330–380[a] | 4160 | unwashed, oven dried |
| 7 | Control | Dilute | 269 | 2485 | diluted before gelling |

[a]Estimated surface area based on similar preparations.

Runs 1, 2, and 6 show an advantage for preparing the base in accordance with the invention utilizing the melt technique as compared with runs wherein the melt was diluted with water to give, in effect, a conventional aqueous system. Run 1 of Example II compared with run 5 of Example I shows even more the advantage for the melt preparation compared with the conventional aqueous preparation so far as productivity is concerned.

As can be seen, in every instance higher surface area was obtained by gelling from a concentrated mass.

While this invention has been described in detail for the purpose of illustration, it is not to be construed as limited thereby but is intended to cover all changes and modifications within the spirit and scope thereof.

We claim:

1. A method for producing aluminum orthophosphate comprising combining an aluminum salt with a source of added orthophosphate ions in a concentrated mass containing 40 weight percent or less water based on the weight of said aluminum salt, combining the resulting composition with a base to form aluminum phosphate hydrogel still in a concentrated mass containing 40 weight percent or less water based on the weight of said aluminum salt, and removing water from said hydrogel to produce a xerogel.

2. A method according to claim 1 wherein said aluminum salt is in the form of a melt and wherein there is present no more than 20 weight percent added water based on said weight of said aluminum salt.

3. A method according to claim 2 wherein said aluminum salt is hydrated aluminum nitrate and 1–15 weight percent water based on the weight of the hydrated aluminum nitrate is added.

4. A method according to claim 2 wherein no extraneous water is added.

5. A method according to claim 2 wherein said water is removed from said hydrogen by contacting said hydrogel with a volatile, oxygen-containing water miscible organic solvent.

6. A method according to claim 4 wherein said gel is formed at a pH of at least 6.

7. A method according to claim 6 wherein said aluminum salt is hydrated aluminum nitrate.

8. A method according to claim 1 wherein said aluminum salt is aluminum sulfate in the form of a syrup in water, the water being present in an amount of 5 to 20 weight percent based on the weight of said aluminum sulfate.

9. A method according to claim 8 wherein said source of phosphate ions is monobasic ammonium phosphate.

10. A method according to claim 1 wherein said hydrogel occupies 3 to 6 cc per gram of aluminum phosphate.

11. A method according to claim 10 wherein said base is one of ammonia or ammonium hydroxide.

12. A method according to claim 1 wherein said source of phosphate ions is monobasic ammonium phosphate.

13. A method according to claim 1 wherein said aluminum salt is molten hydrated aluminum nitrate, said source of orthophosphate ions is monobasic ammonium phosphate, said molten hydrated aluminum nitrate is formed at a temperature of 80° C.±5° C., and gellation to form said hydrogel is carried out by combining the aluminum nitrate/monobasic ammonium phosphate composition with concentrated ammonia hydroxide to form a gel at a pH of at least 6.

14. A method according to claim 1 wherein said water is removed from said hydrogel by contacting said hydrogel with a volatile, oxygen-containing water miscible organic solvent.

15. An aluminum orthophosphate made in accordance with claim 1.

16. An aluminum orthophosphate made in accordance with claim 12.

17. A catalyst produced by combining an aluminum salt with a source of orthophosphate ions in a concentrated mass containing 40 weight percent or less water based on the weight of said aluminum salt, combining the resulting composition with a base to form aluminum phosphate hydrogel still in a concentrated mass containing 40 weight percent or less water based on the weight of said aluminum salt, and removing water to form a xerogel, wherein 0.001 to 10 weight percent chromium based on the weight of the xerogel is introduced at or prior to the xerogel stage, and thereafter activating at an elevated temperature in an oxidizing ambient.

18. A catalyst according to claim 17 wherein an atom ratio of phosphorus/aluminum is within the range of 0.6:1 to 0.9:1 in the resulting aluminum phosphate.

19. An aluminum orthophosphate supported catalyst produced by combining an aluminum salt with a source of phosphate ions in a concentrated mass containing 40 weight percent or less water based on the weight of said aluminum salt, combining the resulting composition with a base to form aluminum phosphate hydrogel still in a concentrated mass containing 40 weight percent or less water based on the weight of said aluminum salt, and removing water to form a xerogel and activating at an elevated temperature, the thus activated aluminum phosphate containing in addition 0.001 to 10 weight percent vanadium based on the weight of the xerogel.

20. A catalyst produced by combining an aluminum salt with a source of orthophosphate ions in a concentrated mass containing 40 weight percent or less water based on the weight of said aluminum salt, combining the resulting composition with a base to form aluminum phosphate hydrogel still in a concentrated mass containing 40 weight percent or less water based on the weight of said aluminum salt, and removing water to form a xerogel, activating at an elevated temperature and introducing a zerovalent chromium compound under anhydrous conditions.

* * * * *

UNITED STATES PATENT AND TRADEMARK OFFICE
CERTIFICATE OF CORRECTION

PATENT NO. : 4,364,855
DATED : December 21, 1982
INVENTOR(S) : Max P. McDaniel et al It is certified that error appears in the above-identified patent and that said Letters Patent are hereby corrected as shown below:

Column 9, line 51, delete "hydrogen" and substitute therefor --- hydrogel ---.

Column 9, line 54, delete "4" and substitute therefor --- 10 ---.

Signed and Sealed this

Seventeenth Day of May 1983

[SEAL]

Attest:

DONALD J. QUIGG

Attesting Officer

Acting Commissioner of Patents and Trademarks